United States Patent [19]

Smith

[11] Patent Number: 4,736,582
[45] Date of Patent: Apr. 12, 1988

[54] GAS TURBINE ENGINE FUEL CONTROL SYSTEM

[75] Inventor: Trevor S. Smith, Sutton Coldfield, England

[73] Assignee: Lucas Industries Public Limited Company, Birmingham, England

[21] Appl. No.: 934,994

[22] Filed: Nov. 26, 1986

[30] Foreign Application Priority Data

Dec. 14, 1985 [GB] United Kingdom ............... 8530847

[51] Int. Cl.⁴ ............................................. F02C 9/28
[52] U.S. Cl. ................................................. 60/39.281
[58] Field of Search ..................................... 60/39.281

[56] References Cited

U.S. PATENT DOCUMENTS

| | | | |
|---|---|---|---|
| 3,049,139 | 8/1962 | Thompson et al. | 60/39.281 |
| 3,672,163 | 6/1972 | White | 60/39.281 |
| 3,808,801 | 5/1974 | Taylor | 60/39.281 |
| 3,958,415 | 5/1976 | Lewis | 60/39.281 |

*Primary Examiner*—Louis J. Casaregola
*Attorney, Agent, or Firm*—Leydig, Voit & Mayer

[57] ABSTRACT

A gas turbine engine fuel control has spill value responsive to an input control signal, for spilling fuel from a supply passage. A pressurizing valve controls flow from the supply passage to the engine, in response to the pressure in the supply passage. A throttle valve in series with the pressurizing valve maintains the pressure difference across the pressurizing valve substantially constant. A selector valve is operable to shut both the pressurizing valve and a shut-off element in the throttle valve.

7 Claims, 2 Drawing Sheets

GAS TURBINE ENGINE FUEL CONTROL SYSTEM

TECHNICAL FIELD

This invention relates to a fuel control system for a gas turbine engine.

BACKGROUND

It is known, for example from U.S. Pat. No. 3,958,415, to provide a fuel control system in which flow to a gas turbine engine is regulated by a spill valve which is responsive to an electrical flow demand signal, the system including a pressure responsive valve in the flow path to the engine. The pressure responsive valve acts to increase flow in response to an increase in its own upstream pressure and has a profile such that the rate of change of flow is greater at higher pressures than at lower pressures. Such a pressure responsive valve is commonly referred to as a pressurising valve and has the effect of counteracting the square law characteristic of fuel flow through the orifices of the engine burners, whereby flow through the burners is more nearly proportional to the pressure of the fuel upstream of the pressurising valve, and hence to the magnitude of the electrical flow demand signal.

It is a disadvantage of the above system that response of the pressurising valve is to pressure only, and this has the effect that flow to the engine burners may be affected by factors other than that of the magnitude of the electrical demand signal, and may vary by as much as 20% from the demanded flow.

DISCLOSURE OF THE INVENTION

It is an object of the present invention to provide a fuel control system of the foregoing general type in which correspondence of metered and demanded flows is improved, this being effected by the inclusion, inter alia, of means for controlling the pressure difference across the pressurising valve.

According to the invention there is provided a fuel control system for a gas turbine engine, comprising a passage through which fuel can flow to said engine, a spill valve responsive to the magnitude of an electrical flow demand signal, for spilling fuel from said passage, a pressurising valve for controlling flow through said passage in accordance with the pressure at an inlet of said spill valve, and a throttle valve in series with said pressurising valve, said throttle valve being responsive to an increase or decrease in pressure difference across said pressurising valve to decrease or increase respectively the flow through said passage, thereby to maintain said pressure difference substantially constant.

An embodiment of the invention will now be described by way of example only and with reference to the accompanying drawings

BEST MODE FOR CARRYING OUT THE INVENTION

Figure 1:
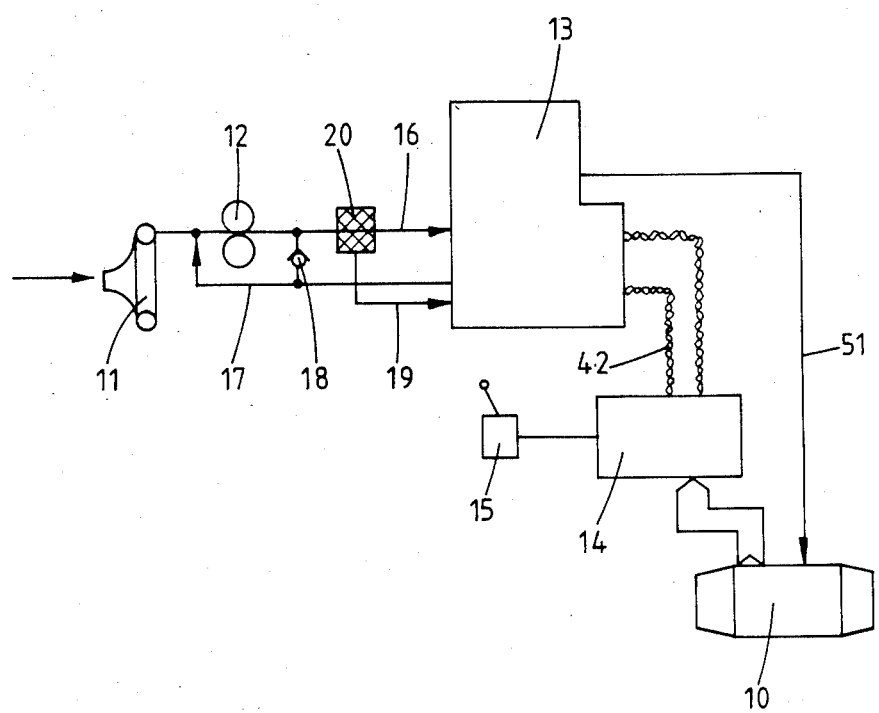
FIG. 1 is a diagram showing a gas turbine engine and an associated fuel control system.

As shown in FIG. 1 a gas turbine engine 10 is supplied with fuel by a series arrangement of a centrifugal pump 11 and a positive displacement pump 12, by way of a flow control arrangement 13. The flow control arrangement 13 is responsive to electrical signals from a control circuit 14 which is in turn responsive to input signals from the engine 10 and to an engine speed demand control 15. The circuit 14 is of the type shown and described in U.S. Pat. No. 3,958,415, but forms no part of the present invention. Fuel flows to the arrangement 13 through a supply line 16 and a low pressure return line 17 communicates with the upstream side of the pump 12. A relief valve 18 of a conventional type is connected between the lines 16, 17.

A high pressure fuel line 19 communicates with the line 16 through a filter unit 20.

Figure 2:
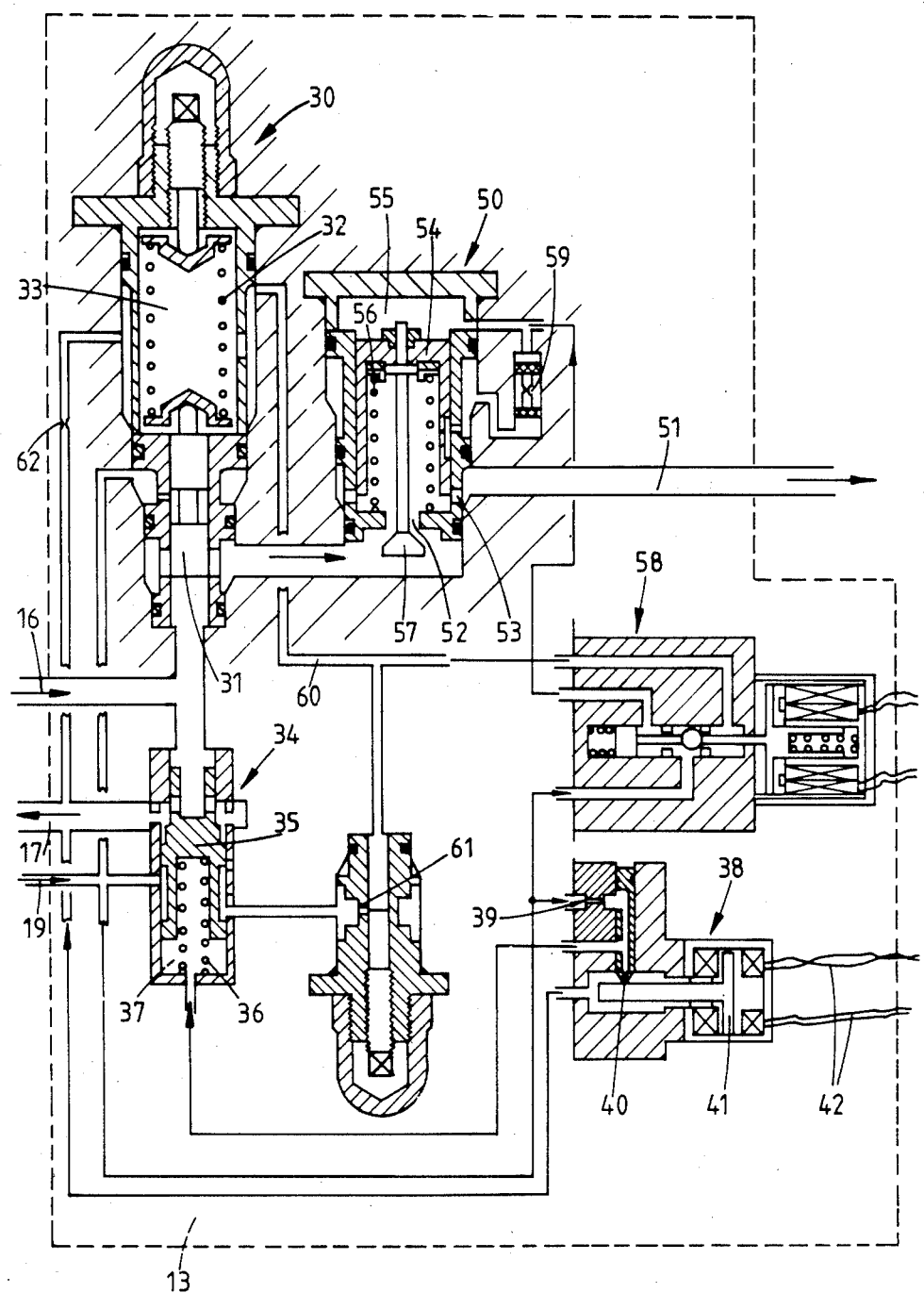
FIG. 2 is a diagram of a flow control arrangement forming part of FIG. 1.

The arrangement 13 is shown in more detail in FIG. 2 and includes a pressurising valve 30 having a spool control element 31 one end of which is responsive to the pressure in the line 16. The element 31 is biased against this pressure by an adjustable spring 32 and the pressure in a chamber 33. The supply line 16 can communicate with the return line 17 through a spill valve 34 having a control element 35 which is urged against the pressure in line 16 by a spring 36 and by a servo pressure in a chamber 37. The pressure in chamber 37 is controlled by a valve device 38 having a fixed orifice 39 and a variable orifice 40 connected in series between the lines 16, 17, the pressure in chamber 37 being derived from that between the orifices 39, 40. The orifice 40 is controlled by a torque motor 41 responsive to fuel flow demand signals on lines 42 from the control circuit 14.

A throttle valve 50 is connected in series with the valve 30 between the supply line 16 and an outlet connection 51 to the engine 10. The throttle valve 50 has an inlet port 52 and an outlet port 53, flow through the outlet port 53 being regulated by a control element 54 which is urged against the pressure in a chamber 55 by a spring 56 and the pressure in the port 52. Secured to the control element 54 for movement therewith is a closure 57 for the port 52. In normal operation the closure 57 does not affect flow through the ports 52, 53, flow through the port 53 being regulated only by the element 54. The pressure in the chamber 55 is controlled by a solenoid-operated selector valve 58 which, in the energised position shown, connects the high pressure line 19 to the chamber 55, maintaining the port 52 open. In this condition the control element 54 is responsive to the pressure immediately downstream of the valve 30 as well as to the pressure in the line 16, applied through the filter unit 20, line 19 and valve 58. The control element 54 is thus responsive to the pressure difference across the valve 30, an increase in that pressure difference moving the control element 54 in a direction to reduce fuel flow through the valve 30, thereby maintaining the aforesaid pressure difference substantially constant.

The solenoid valve 58 is controlled by the circuit 14 and is de-energised to shut off fuel flow to the engine 10, in which circumstance the chamber 55 is isolated from the high pressure line 19, the pressure in chamber 55 bleeding through a flow restrictor 59 to the outlet connection 51 and allowing the control element 54 and closure 57, which may be an elastomeric element, to move upwardly to shut the port 52. In this condition the solenoid valve 58 applies high pressure through a line 60 to the chamber 33 of the valve 30, urging the latter to shut off flow from the supply line 16.

A requirement to shut off fuel flow to the engine 10 will be accompanied by a minimum fuel demand signal on the lines 42 and the valve arrangement 38 will cause the pressure in chamber 37 of the spill valve 34 to fall to that in the return line 17. The spill valve 34 thus becomes substantially fully open and fuel delivered on the line 16 is returned to the upstream side of the pump 12 through the line 17. The high pressure line 19 can communicate with the line 60 through an adjustable orifice 61, the connection between the orifice 61 and line 19 being shut by the control element 35 when the spill valve 34 is fully shut. In normal operation the orifice 61 is in series with the chamber 33 and a fixed orifice 62 between the lines 19 and 17. A servo pressure between that in the lines 19, 17 is thus maintained in the chamber 33 and assists the spring 32 in opposing the pressure in line 16. This servo pressure is adjustable by means of the orifice 61 to compensate for manufacturing tolerances in the valve 30.

At low pump delivery flow during engine starting the spill valve 34 shuts and servo flow to the chamber 33 is arrested, flow to the engine 10 being thereby increased.

The face of the control element 31 on which the pressure in line 16 acts also defines a metering edge of the valve 30. At high pressures in the line 16 the valve 30 will be wider open, having a larger effective flow area. Thus, the flow area of valve 30 is a function of the pressure in line 16, which is proportional to the fuel flow demand signal on line 42 to valve 38. The pressure drop across this flow area is kept constant by the throttle valve 50 so that flow is also a similar function of the pressure in line 16, and is independent of such factors as pressure at the engine burners, pressure at the gear pump inlet, etc.

Thus flow can be made any desired function of electrical signals on lines 42 and is independent of other factors.

I claim:

1. A fuel control system for a gas turbine engine comprising:
   a control circuit for generating an electrical fuel flow demand signal;
   a passage through which fuel can flow to the engine;
   a spill valve including a first flow control means for controlling the amount of fuel returned from said passage to a low pressure zone in response to said electrical fuel flow demand signal; and
   a pressurizing valve including a second flow control means for controlling flow through said passage in response to a pressure at an inlet of said spill valve in such a manner as to increase flow in response to an increase in pressure;
   a throttle valve in series with said pressurizing valve, said throttle valve including a third flow control means for increasing or decreasing flow through said passage in response to a decrease or increase, respectively, in a pressure difference across said pressurizing valve so that said pressure difference is maintained substantially constant.

2. A system as claimed in claim 1 in which said control circuit includes means for generating a servo pressure signal and a selector valve having a plurality of states and operable in a first of its states to raise said servo pressure signal to a high level; and
   said second flow control means decreases flow through said passage in response to said servo signal and shuts off flow through said passage when said servo pressure signal is raised to said high level.

3. A system as claimed in claim 2 in which said selector valve is also operable to communicate to said throttle valve an operating pressure derived from the pressure at the inlet of said pressurising valve.

4. A system as claimed in claim 3, in which said throttle valve comprises a third flow control means icluding an element which moves in coordination with said second flow control means to shut off flow through said throttle valve.

5. A system as claimed in claim 4 which includes means for biasing said third flow control means to a shut position, said pressure at the inlet of said pressurizing valve being operable to urge said flow control means in opposition to said biasing means.

6. A system as claimed in claim 5 which includes means for venting said operating pressure to a low pressure when said selector valve is in its first state.

7. A system as claimed in claim 6 in which said venting means comprises a flow restrictor interconnecting zones on opposite sides of said first flow control means.

* * * * *